United States Patent
Menzel et al.

(10) Patent No.: US 9,299,252 B2
(45) Date of Patent: Mar. 29, 2016

(54) METHOD FOR CHECKING COMMUNICATION MESSAGES IN VEHICLE-TO-ENVIRONMENT COMMUNICATION AND SUITABLE RECEIVER

(75) Inventors: Marc Menzel, Weimar (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 51 days.

(21) Appl. No.: 14/114,107

(22) PCT Filed: Mar. 15, 2012

(86) PCT No.: PCT/EP2012/054535
§ 371 (c)(1),
(2), (4) Date: Oct. 25, 2013

(87) PCT Pub. No.: WO2012/146439
PCT Pub. Date: Nov. 1, 2012

(65) Prior Publication Data
US 2014/0055288 A1    Feb. 27, 2014

(30) Foreign Application Priority Data
Apr. 26, 2011   (DE) .......................... 10 2011 018 571

(51) Int. Cl.
*G08G 1/01*   (2006.01)
*G08G 1/052*  (2006.01)
*G08G 1/04*   (2006.01)
*H04W 4/04*   (2009.01)
(Continued)

(52) U.S. Cl.
CPC .............. *G08G 1/052* (2013.01); *G08G 1/0112* (2013.01); *G08G 1/04* (2013.01); *H04L 67/12* (2013.01); *H04W 4/046* (2013.01); *H04L 63/123* (2013.01)

(58) Field of Classification Search
CPC ............ G08G 1/052; G08G 1/096716; G08G 1/0962; G08G 1/166; G08G 1/163; G08G 1/161; G06Q 10/08; G01S 13/931; B60Q 1/525; G07C 9/00111; G07C 5/02; G05S 5/021
USPC ............ 340/936, 539.13, 903, 435, 438, 989, 340/988, 933, 937; 342/357.07, 357.1, 342/357.04; 701/213, 301, 70, 96, 32.3, 701/32.4
See application file for complete search history.

(56) References Cited

U.S. PATENT DOCUMENTS

| 7,005,977 B1 | 2/2006 | Tengler et al. |
| 2004/0124971 A1 | 7/2004 | MacTavish et al. |
| 2007/0043506 A1 * | 2/2007 | Mudalige et al. ............. 701/301 |

(Continued)

FOREIGN PATENT DOCUMENTS

| DE | 10 2004 010197 | 9/2005 |
| DE | 10 2005 056628 | 6/2007 |

(Continued)

*Primary Examiner* — Hoi Lau
(74) *Attorney, Agent, or Firm* — Cozen O'Connor

(57) ABSTRACT

A method for checking communication messages in vehicle-to-environment communication, a communication message being received and evaluated, and to a receiver suitable for carrying out the method. In order to check a communication message, a feature obtained from the content of the communication message is compared to a feature that corresponds to said feature, the corresponding feature being obtained by a sensory system that is independent of the vehicle-to-environment communication.

10 Claims, 2 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2007/0188348 A1 | 8/2007 | Bauer et al. | |
| 2008/0252487 A1* | 10/2008 | McClellan et al. | 340/936 |
| 2009/0240432 A1* | 9/2009 | Osanai | 701/300 |
| 2009/0271112 A1* | 10/2009 | Basnayake | 701/213 |
| 2010/0164789 A1* | 7/2010 | Basnayake | 342/357.04 |
| 2011/0128147 A1* | 6/2011 | Pan | 340/539.13 |
| 2011/0260846 A1* | 10/2011 | Mochizuki et al. | 340/435 |
| 2011/0260858 A1* | 10/2011 | Eruchimovitch et al. | 340/539.13 |
| 2012/0068859 A1* | 3/2012 | Mochizuki | 340/903 |

FOREIGN PATENT DOCUMENTS

| | | |
|---|---|---|
| DE | 10 2008 053531 | 5/2009 |
| DE | 10 2009 017731 | 11/2009 |
| DE | 10 2009 007 244 | 8/2010 |
| DE | 10 2010 029 418 | 12/2010 |
| WO | WO 2009/101163 | 8/2009 |

* cited by examiner

METHOD FOR CHECKING COMMUNICATION MESSAGES IN VEHICLE-TO-ENVIRONMENT COMMUNICATION AND SUITABLE RECEIVER

CROSS REFERENCE TO RELATED APPLICATIONS

This is a U.S. national stage of application No. PCT/EP2012/054535, filed on Mar. 15, 2012. Priority is claimed on German Application No. DE102011018571.2 filed Apr. 26, 2011, the content of which is incorporated herein by reference.

BACKGROUND OF THE INVENTION

1. Field of the Invention

The invention relates to a method for checking communication messages in vehicle-to-environment communication, which is also referred to as C2X communication, and a suitable receiver. In the checking method, a communication message is received and evaluated.

2. Description of Prior Art

In connection with C2X communication, for which a uniform standard is about to be defined, the security of the exchanged radio messages and the information contained therein is discussed. The systems based on C2X communication offer a wealth of new facilities for driver assistance systems, vehicle safety systems, systems for improving mobility, and other extended services.

However, the risk exists that these additional systems and functions are adversely affected with respect to their information content or their security, if false information on the C2X communication is disseminated.

The aims of the previously known approaches to the security of C2X communication are above all the protection of privacy, authentication of the sender, and protection against hacking by means of cryptographic methods. The main aim is to produce a system that is protected and unsusceptible to the possible dangers.

However, the history of computer technology and software shows that a complete system security of computer systems does not exist. If the internal security of the systems does not take effect due to technical measures, the only option remaining is the identification of the perpetrators exploiting the weak points and criminal prosecution.

However, in computer systems in general and in C2X communication specifically, the problem of recognizing false information and identifying the sender of this information exists.

SUMMARY OF THE INVENTION

An object of one embodiment of the present invention is to enable a facility for the reliable checking of the information transferred in a C2X communication message in real time.

In the checking of the communication message provided according to one embodiment of the invention, it is provided that a feature obtained or derived from the content of the communication message is compared with a feature corresponding to this feature, said corresponding feature being obtained by a sensory system which is independent of the vehicle-to-environment communication. The radio messages dispatched by C2X communication are therefore checked by the sensory system and sensors that are not affected by the communication. These may simply be cameras and/or other environment sensors of the receiver, wherein, in this application, a receiver is understood not to mean the receiver unit, but the participant in the C2X communication equipped with the receiver unit.

A further fundamental facility for checking the C2X communication messages is provided by a comparison of the content and physical characteristics of the communication, i.e., for example, the position used in the content of the communication message and the determined position of the transmitter, for example by a direction finding. Similar to the receiver, the transmitter is also understood not to mean the transmit unit, but the participant in the communication network equipped with the transmit unit, for example a vehicle, a Road Side Unit RSU, a traffic light, or any other participant.

Due to the direct comparison of the content of the communication message with parameters recorded by sensors, the proposed method according to one embodiment of the invention is suitable for a direct C2X communication, i.e. a communication without a backend transmitting the communication messages. However, the invention is not restricted to this communication type. Examples of these direct communication technologies are, in particular, WLAN communication according to one of the standards IEEE 802.11a/b/g/n/p, WiMax, Bluetooth, ZigBee, RKE (Remote Keyless Entry), IR (infrared), etc.

According to a preferred embodiment of the proposed method, the feature obtained from the communication message may be a position transmitted in the C2X communication and/or the speed of the participating transmitter, for example the vehicle. The position and/or speed of the participating transmitter is then determinable by an independent sensor system as a comparison value.

A suitable sensor system can, for example, carry out a radio direction finding on the basis of the received radio signal, which recognizes the receiving direction, wherein the position of the transmitter is determinable through a plurality of radio direction findings with antennas locally separated from one another via trigonometric functions, for example triangulation methods. According to one embodiment of the invention, a suitably selected array of directional antennas is appropriate for the various antennas. A speed measurement is also possible through temporally successive measurements in the radio direction finding. In addition, the distance between the receiver and transmitter can be determined or estimated through evaluation of the received field strength.

A position and speed measurement can also be performed by radar or laser measuring devices, or generally by a sensor system that can carry out a speed measurement through transmission of beams and reception of beams reflected on an object. With sufficiently directional radiation, a position determination is also possible via the absolute transit time.

According to one embodiment of the invention, cameras can be considered as a further sensor system, wherein a position determination is possible via an image evaluation if the camera is calibrated and, if necessary, specific features of the object are known, for example the size of the number plate. The position of the object in three-dimensional space can then be determined from this information. A position evaluation can also be carried out by stereo cameras without knowledge of specific features of the object.

The aforementioned sensor system is particularly well-suited for carrying out the method. However, the invention is not necessarily restricted to this sensor system, but also encompasses other suitable sensor systems that are able to determine the information whose content is transferred in the radio messages through suitable recording of corresponding information separated from the communication.

According to one embodiment of the method according to the invention, it can also be provided that the feature obtained from the communication message is a typification of the participating transmitter transmitted in the C2X communication, and that the type of participating transmitter is determinable by an independent sensor system.

Here, a camera with image evaluation is particularly suitable as a sensor system in order to establish, for example, the "emergency vehicles" type with recognition of an emergency journey through activation of the blue light or siren by an optical or acoustic sensor system and evaluation. A typification of the participating transmitter can also take place in a traffic flow recognition, in which, for example, the traffic flow is counted by a transmit unit and sent to a supervisory central station. This central station can, for example, check the information relating to this traffic flow via a separate receiver.

In one embodiment of the present invention, which can also be used, if necessary, in addition to the previously described checking methods, the feature obtained from the communication message is a status of the participating transmitter transferred in the C2X communication, and the status of the participating transmitter is determinable by the independent sensor system.

In this case, the participating transmitter may, for example, be a traffic light, which transfers its status (red, amber, green) in the C2X communication. A monitoring device with a camera can be considered, for example, as a receiver, which visually monitors the status of the traffic light. Faults in the communication originating from the traffic light and also possible incorrect information can thereby be identified by a third-party transmitter installed some way away from the traffic light and, if necessary, further checks can be instigated.

According to one embodiment of the invention, it is particularly advantageous if, in the absence of correspondence, which is determined, for example, by the exceeding of tolerance ranges suitable for the obtained feature and/or the sensor system, a message is generated by the receiver, allowing inferences to be made concerning the identity of the transmitter and/or enabling its identification. These messages may, in particular, be photos, data extracted from photos, for example a number plate, a transmit device ID identifier, for example MAC, a position of a stationary transmitter or the like. The message can be transferred via C2X or other communication to an evaluation point, wherein the evaluation point may be both a central and a mobile operations center. It is also possible to store the messages in a storage unit of the receiver for retrieval or export and retrieve them from the storage unit in a suitable manner. Through messages of this type, it is possible in many cases to identify a knowingly false transmitter and simultaneously document the incorrect communication message.

One embodiment of invention also relates to a receiver to carry out a method for checking communication messages in vehicle-to-environment communication (C2X communication), in which a communication message is received and evaluated, wherein the receiver has a receiving device for the reception, if necessary a transmit device for the transmission of communication messages in vehicle-to-environment communication, a sensor device independent from the vehicle-to-environment communication, and a computing unit. According to the invention, the computing unit is configured to carry out the above method or parts thereof.

According to a preferred embodiment, the sensor device has a camera, if necessary also a stereo camera, a radio direction finding device, preferably with an array of directional antennas, or a speed-measuring device. The speed-measuring device may be a radar or laser measuring device or generally a sensor system that can perform a speed or position measurement as already described through emission of beams and reception of beams reflected from an object. Furthermore, other sensors, which are suitable for recording the content of the communication message with their own sensor measuring values, can be considered according to the invention.

According to one embodiment of the invention, the receiver can be designed as a mobile or stationary unit. A mobile receiver unit has the advantage that it can be used flexibly at various locations in order to test the C2X communication, for example also in connection with checks carried out by the police. Stationary units can preferably be integrated into units already participating in the C2X communication and thus continuously, preferably at particularly security-relevant locations of the C2X communication network, carry out a suitable content-related check of the C2X messages to intervene in the event of targeted false information or faults.

Both a mobile and a stationary receiver can be integrated into a participant in the vehicle-to-environment communication with further functions.

Further advantages, features or possible applications of the present invention can be found in the following description of example embodiments and the drawing. All described and/or graphically illustrated features in themselves or in any given combination form the subject-matter of the present invention, also independently from their summary in the claims or their back-references.

DETAILED DESCRIPTION OF THE PRESENTLY PREFERRED EMBODIMENTS

Figure 1:
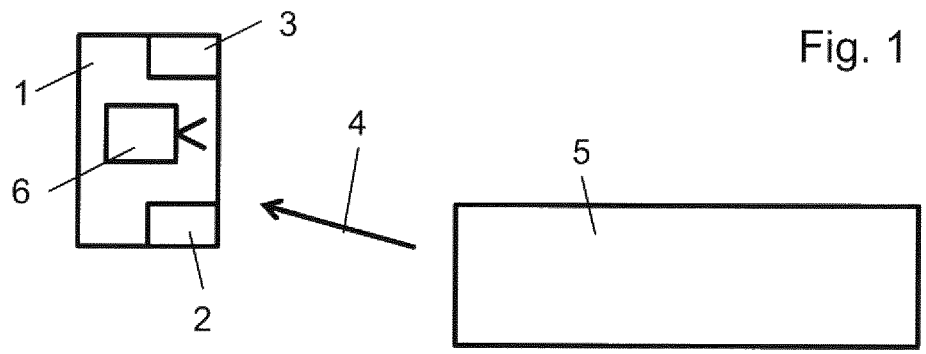
FIG. 1 is a receiver with a camera as a sensor unit.

Each of the receivers 1 shown in FIGS. 1 to 4 has a receive device 2 for participation in the vehicle-to-environment communication that is able to receive communication messages 4 in the vehicle-to-environment communication. If necessary, the receive device can also be designed as a combined receive and transmit device 2, which, along with the reception of communication messages 4, is also able to transmit corresponding communication messages 4 relating to the vehicle-to environment communication. Furthermore, the receiver 1 has a computing unit 3 configured to carry out the method according to the invention for checking communication messages 4 in the vehicle-to-environment communication.

To do this, the communication messages 4 received by the receive unit 2 are transmitted, received, and evaluated, for example, by a motor vehicle 5 as a transmitter participating in the road traffic. The communication messages 4 can contain a variety of information relating to the vehicle 5, such as, for example, the vehicle type (private motor vehicle, truck, emergency vehicle or the like) and details regarding the position and speed of the motor vehicle 5.

To check the correctness of the information relating to the motor vehicle 5 contained in the communication message 4, the receiver 1 has a camera 6 as a sensor device that can monitor the motor vehicle 5, particularly if the receive unit 2 receives a communication message 4 of the motor vehicle 5. In the computing unit 3, at least one specific feature is then extracted from the content of the communication message 4 for the check and is compared with the feature corresponding to this feature, which corresponding feature is obtained by the sensor system 6 independent from the vehicle-to-environment communication, which is formed in this case by the sensor device with the one camera.

The example shown in FIG. 1 can, in particular, check the type of the motor vehicle (emergency vehicle) if the communication message 4 transmits the message that the vehicle 5 is an emergency vehicle. Emergency vehicles can be distinguished in a simple manner from other vehicles in a photograph by external features, such as a blue light/siren, inscription or the like. Furthermore, lists which have number plates of the emergency vehicles can be stored in the computing unit 3 of the receiver 1, so that said number plates are identifiable through comparison with a recorded number plate extracted from the recording. In this case, by taking a photo of the motor vehicle 5, it is possible to check whether the communication message 4 transmitted by the vehicle 5 is correct.

A receiver 1 of this type can be installed in a monitoring device, for example in an automatic speed camera to penalize red light violations or speeding offences, the red light violations or speeding offences being identified and recorded. If a receiver 1 according to one embodiment of the invention is integrated into a monitoring device of this type, the monitoring device can receive the communication message 4 of the motor vehicle 5 that presents itself as an emergency vehicle or rescue vehicle. In this case, the vehicle is photographed. The number plate and the vehicle type are subsequently checked in the computing unit 3 or at a central evaluation point. If the vehicle really is an emergency vehicle, which is recognizable by the vehicle labeling, color, inscription, and/or blue light, and/or if the associated number plate is registered as an emergency vehicle, no action is taken and the photo is discarded.

However, if the vehicle 5 is a vehicle that only presents itself as an emergency vehicle, a criminal prosecution can be instigated. To do this, the receiver 1 generates a message, for example with a photo of the required vehicle 5, on which the driver and, in particular, the number plate are preferably recognized. By a message of this type, the holder of the vehicle can be identified based on the number plate and/or the number plate and the vehicle type can be transferred, for example directly to patrol vehicles in the vicinity. This has the advantage that the pursuit is quickly possible. In this respect, it is appropriate to carry out the evaluation directly in the computing unit 3 of the receiver 1. However, according to one embodiment of the invention, a central station, which can refer back to the images of the monitoring device without a great temporal delay, can be provided instead of the computing unit 3.

The proposed method does not interfere with the privacy of private individuals, since they are not photographed as long as they do not present themselves as an emergency vehicle and do not commit a breach of law. In contrast, emergency vehicles in use and enforce their right of way do not enjoy any privacy protection.

An effective check on the communication messages 4 transmitted by a motor vehicle 5 is therefore achieved by the proposed method. Instead of a monitoring device for red light violations, the method can be used particularly effectively in a device for speeding offences. In this case, the receiver 1 may preferably be a mobile monitoring device, so that traffic offenders and perpetrators in a normal traffic monitoring can promptly be flagged down from the flowing traffic.

For these monitoring devices, it is particularly suitable if, in addition to a purely visual monitoring, it is also possible to evaluate the position and/or speed of the participating transmitter in the motor vehicle 5 from the features transmitted in the communication message 4 of the C2X communication.

Figure 2:
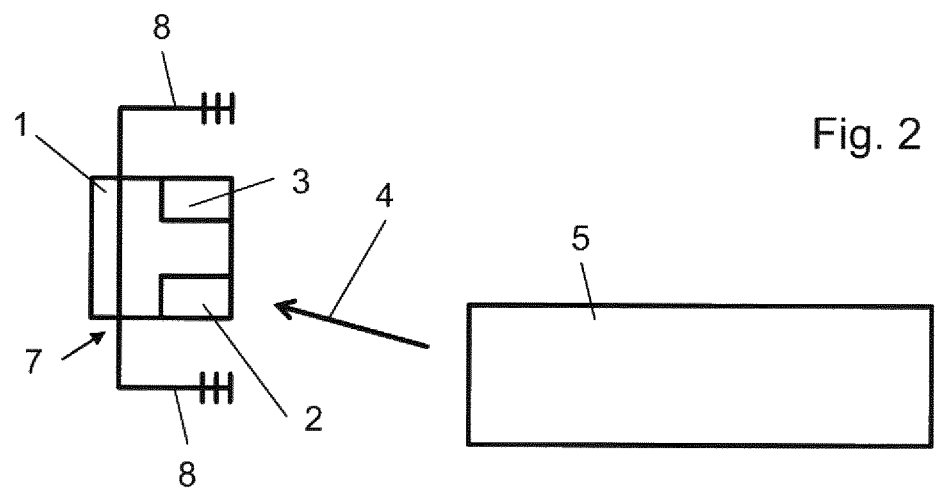
FIG. 2 is a receiver with an array of directional antennas as a sensor unit.

An example of a corresponding receiver is shown in FIG. 2, in which the receiver 1 with the receive unit 2 and the computing unit 3 has a radio direction finding device 7 as a sensor device with an array of directional antennas 8. With these directional antennas 8, the direction from which the radio messages 4 have been received can easily be established. If necessary, a height indication can also be taken into account. This information is compared with the positions dispatched in the communication message 4 and, in the absence of correspondence, can be recorded for criminal prosecution, wherein the number plate of the motor vehicle 5 as a false transmitter is ideally recorded by a camera 6, not shown in FIG. 2. If the false transmitter is not a motor vehicle 5 with a number plate, the position of the false transmitter can be determined e.g. by location information of the receiver 1 and the position information relative to the receiver 1, instead of the number plate.

In the case of a stationary receiver 1, this receiver can measure the reception behavior of the environment in advance. It is thus possible to take the received field strength into account in addition to the direction, and, if necessary, to make inferences from this with regard to the distance between the receiver 1 and the transmitter in the motor vehicle 5. This information can additionally be used to validate the dispatched position information in the communication message 4.

Figure 3:
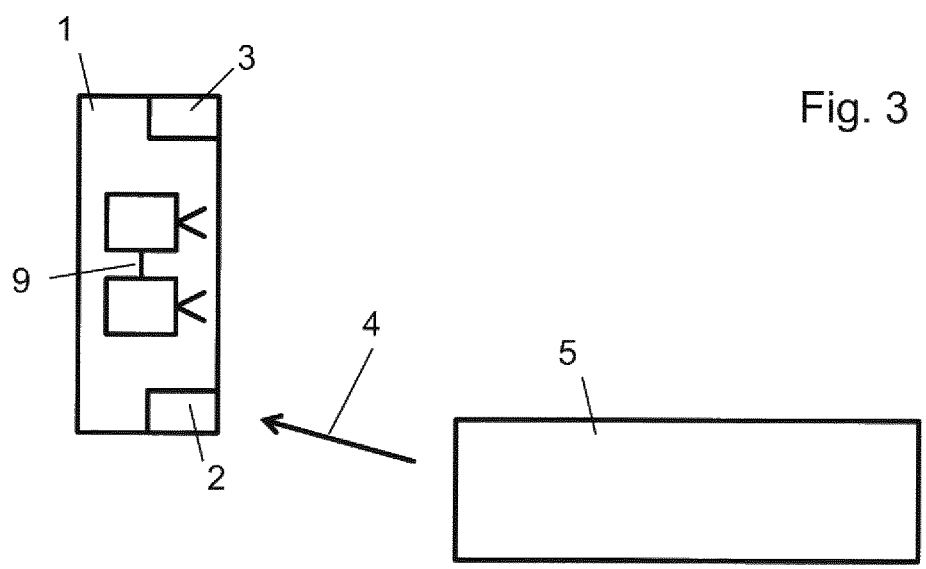
FIG. 3 is a receiver with a stereo camera as a sensor unit.

FIG. 3 shows a further variant of a receiver 1, which has a stereo camera 9 as a sensor device, with which a position determination is in any case possible.

According to one embodiment of the invention, the receiver 1 can also have a radar sensor as a monitoring device for the speed of the transmitter in the motor vehicle 5 and in this way compare the speed transmitted in the communication message 4 with the actually measured speed. The position information can also be monitored with this information by determining the distance between the receiver 1 and the transmitter in the motor vehicle 5 by radar, in particular by a transit time consideration of the transmitted and reflected radar waves. A method of this type is particularly suitable for mobile monitoring units. It is therefore particularly appropriate according to one embodiment of the invention to integrate the receiver 1 into mobile monitoring devices.

Figure 4:
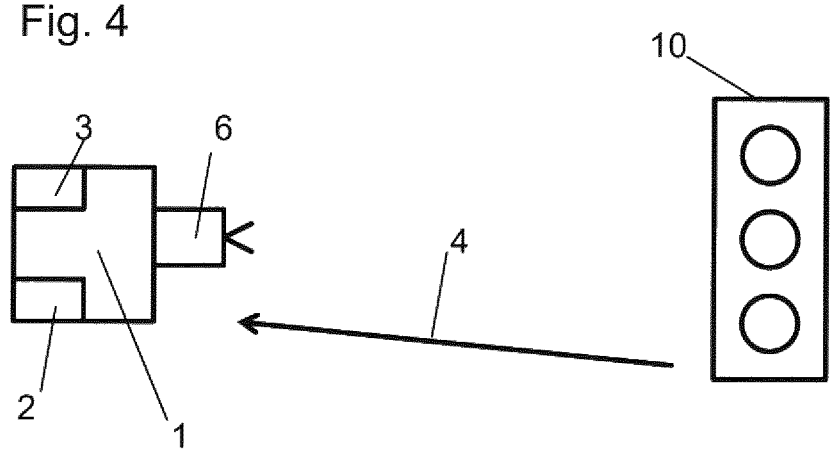
FIG. 4 is a receiver with a camera as a sensor unit for status monitoring of a participant in the vehicle-to-environment communication.

To monitor the status of participants in the C2X communication, it may also be appropriate, by a receiver 1 with a receive unit 2 and a computing unit 3, to monitor the communication messages 4 of a traffic light 10 in which the instantaneous status of the traffic light color (red, amber, green) is transmitted. This is shown in FIG. 4. To do this, the receiver 1 has a camera 6 that records the light signals of the traffic light 10. The times of the traffic light phases can be determined a posteriori therefrom. This information is compared with the dispatched information and, if faults occur, the operator of the traffic light 10 is informed and prompted to clear the fault. If necessary, the C2X transmit unit of the traffic light 10 can also be switched off in order to avoid the transmission of incorrect information.

A corresponding receiver 1 with a camera 6 as a sensor device can also be used to check the traffic flow on a road or highway. This information is compared with information received from a Road Side Unit, which also conveys the traffic flow. In the absence of a correspondence, a mobile monitoring unit can be sent out for verification, in case the Road Side Unit as a stationary monitoring unit cannot detect the fault or false transmitter.

By the proposed method and the corresponding receiver 1, which may be designed as a mobile receiver or may be integrated into other functional units, the content-related information of communication messages 4 in the C2X communication can be checked in a simple manner by an independent sensor system 6, 7, 9 in order to identify faults and expose deliberately false communication messages 4 and subject those responsible to a criminal prosecution.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for checking communication messages in a vehicle-to-environment communication, comprising:
    receiving a communication message by a receiver in a first vehicle;
    evaluating the received communication message;
    obtaining a feature from the communication message regarding a second vehicle that transmitted the communication message;
    obtaining a corresponding feature by a sensor system arranged in the first vehicle that is independent from the vehicle-to-environment communication that corresponds to the obtained feature; and
    comparing the obtained feature with the corresponding feature,
    wherein the feature obtained from the communication message includes a vehicle type of participating transmitter, and that the vehicle type of the participating transmitter is determinable by the independent sensor system.

2. The method as claimed in claim 1,
    wherein the feature obtained from the communication message is at least one of a transmitted position of a participating transmitter and a speed of the participating transmitter, and
    wherein the least one of the transmitted position of the participating transmitter and the speed of the participating transmitter is determinable by the independent sensor system.

3. The method as claimed in claim 2, wherein the vehicle type of the participating transmitter is one of a private motor vehicle, a truck, and an emergency vehicle.

4. The method as claimed in claim 2, wherein the feature obtained from the communication message is a transmitted status of the participating transmitter, and that the status of the participating transmitter is determinable by the independent sensor system.

5. The method as claimed in claim 1, wherein, in the absence of a match between the obtained feature and the corresponding feature, a message is generated by the receiver that at least one of allows inferences to be made about an identity of the transmitter and enables identification of the transmitter.

6. A receiver configured to check a communication message in a vehicle-to-environment communication in which the communication message is received and evaluated, wherein the receiver comprises:
    a receiver that receives the communication message from a first vehicle containing a feature in the vehicle-to-environment communication, the receiver being arranged in a second vehicle;
    a sensor arranged in the second vehicle that is independent from the vehicle-to-environment communication and configured to obtain a corresponding feature that corresponds to the feature in the vehicle-to-environment communication; and
    a computing unit, wherein the computing unit is configured to:
        evaluate the communication message;
        obtain the feature from the communication message; and
        compare the feature from the communication message with the corresponding feature,
    wherein the feature obtained from the communication message is a vehicle type of participating transmitter, and that the vehicle type of the participating transmitter is determinable by the independent sensor system.

7. The receiver as claimed in claim 6, wherein the sensor device comprises at least one of a camera, a radio direction finding device, and a speed-measuring device.

8. The receiver as claimed in claim 6, wherein the receiver is a mobile stationary unit.

9. The receiver as claimed in claim 6, wherein the receiver is integrated into a participant in the vehicle-to-environment communication with further functions.

10. The receiver as claimed in claim 7, wherein the receiver is a mobile stationary unit.

* * * * *